United States Patent

[11] 3,574,509

| [72] | Inventors | Ramon J. Zentis<br>McKean, Pa.;<br>John R. Goode, Westport, Conn.; Donald F. Durso, Memphis, Tenn.; John H. Schmid, Erie, Pa. |
|---|---|---|
| [21] | Appl. No. | 799,422 |
| [22] | Filed | Feb. 14, 1969 |
| [45] | Patented | Apr. 13, 1971 |
| [73] | Assignee | Zurn Industries, Inc.<br>Erie, Pa. |

[54] BACKWASH FILTER
16 Claims, 5 Drawing Figs.

[52] U.S. Cl. ................................................ 210/107,
210/108, 210/413
[51] Int. Cl. .................................................. B01d 29/38
[50] Field of Search .......................................... 210/107,
108, 413, 414, 415

[56] References Cited
UNITED STATES PATENTS

| 2,066,479 | 1/1937 | MacIsaac | 210/415X |
| 2,275,958 | 3/1942 | Hagel | 210/(108UX) |
| 3,168,467 | 2/1963 | Drerea | 210/108 |
| 3,256,995 | 6/1966 | Schmid et al. | 210/415X |
| 3,357,566 | 12/1967 | Schmid et al. | 210/333 |

Primary Examiner—John Adee
Attorney—Charles L. Lovercheck

ABSTRACT: A filter for liquid and a control. The filter element is made up of two concentric perforated cylinders which restrain a very fine wire mesh between them, this assembly being supported in a hollow body. Liquid is fed into the inside of the filter element and flows to an outlet, by way of the perforations, through the mesh. The perforations form cavities which serve as reservoirs on the inside of the mesh. A backwash arm is rotated about an axis at the center of the filter element. The backwash arm has a slot defined by shaped members which sealingly sweep over the inner periphery of the filter element. Thus, debris which accumulates in the perforations is washed back through the slot in the arm and to a waste system by the impetus of the pressure on the downstream side of the filter element. The control is made to actuate the backwash arm at a rate of speed such that it will make a sweep around the inner periphery of the filter element only as required to clean the mesh and maintain flow. This is accomplished by a circuit that senses the fluid pressure drop across the filter. The motor which drives the backwash arm can be driven continuously or intermittently in response to this pressure drop to keep the cavities from filling with debris beyond a predetermined amount. A positive displacement device is connected to the outlet of the backwash arm, to meter the amount of backwash fluid. An interrupter is provided to stop this backwash device as the arm passes over unperforated spots in the filter element.

PATENTED APR 13 1971

INVENTORS
RAMON J. ZENTIS
JOHN R. GOODE
DONALD F. DURSO
JOHN H. SCHMID

INVENTORS
RAMON J. ZENTIS
JOHN R. GOODE
DONALD F. DURSO
JOHN H. SCHMID

BY Charles L. Loverchek

ATTORNEY

BACKWASH FILTER

BACKGROUND OF THE INVENTION

This invention relates to filters and more particularly to backwash filters and controls therefor for filtering liquids where it is desirable to waste a minimum amount of liquid during backwash.

SUMMARY OF THE INVENTION

It has been discovered that successful operation of the filter is dependent upon the mechanical condition of the filter insofar as separation of the feed from the filtrate and the sealing efficiency of the backwash arm shoes are concerned. Continuous operation of the filter is successful and economical through proper control of backwash arm rotational speed and flow rate of backwash liquid. The two foregoing factors must be regulated with relation to filter throughput and amount of solids entrained in the liquid to be filtered. The elements involved in the accurate control of the filter include a variable speed backwash arm drive motor, a variable speed backwash flow control device, an adjustable proportional control to maintain a speed relationship between the arm drive motor and the backwash metering motor, a differential pressure controlled to vary the arm motor speed with relation to head loss across the filter element, tachometers to regulate and indicate arm motor speed and backwash motor speed, a motor control to shut off the backwash flow while the arm ports are passing over the "dead spots" on the filter element, pressure gauges to indicate inlet, outlet, and backwash pressures, and switches necessary to isolate each of the aforementioned items to calibrate them or check circuitry.

Also desirable are several safety and/or convenience items which include: a high-pressure feed pump cutoff with alarm to prevent excessive internal pressures in the event of screen blinding, a low-pressure cutoff with alarm to stop filter operation (since a positive internal pressure with respect to the backwash connection is necessary for proper operation), a pressure differential recorder, a revolution counter backwash device (to record backwash), an outlet restriction valve to regulate internal pressure, and a feed pump to control feed rate.

OBJECTS OF THE INVENTION

It is, accordingly, an object of the invention to provide a combination filter and control means for backwashing the filter in an optimum cycle.

Another object of the invention is to provide a filter and control means.

Another object of the invention is to provide an improved filter and control means for filtering liquids.

IN THE DRAWINGS

DETAILED DESCRIPTION

Strainer Body

Figure 1:
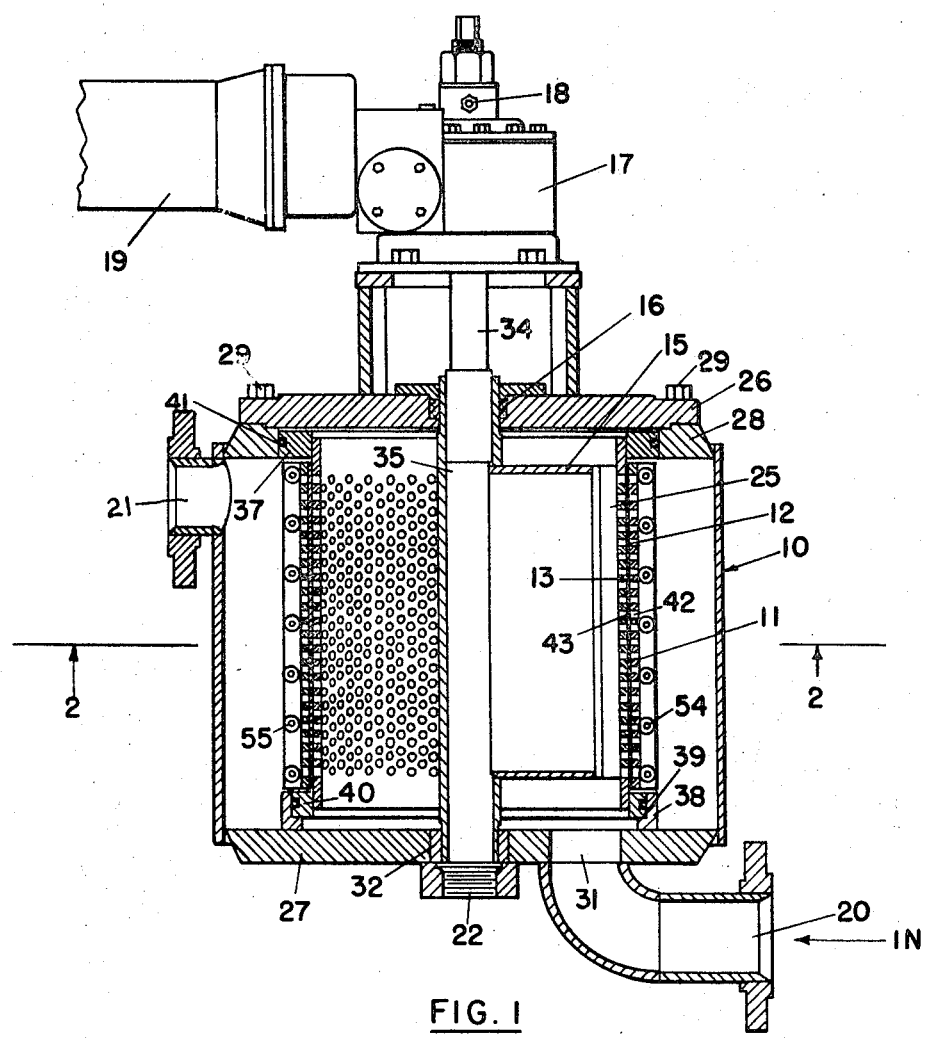
FIG. 1 is a longitudinal cross-sectional view of a filter according to the invention.
Figure 2:
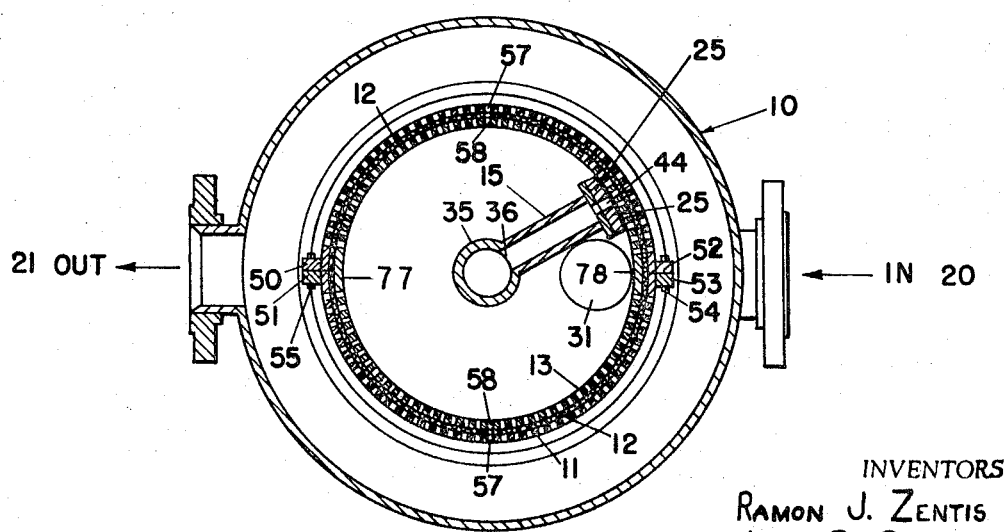
FIG. 2 is a cross-sectional view of the filter taken on line 2—2 of FIG. 1.

The continuously backwashable filter or strainer shown in FIGS. 1 and 2 has a hollow body which is made from a generally cylindrical outer shell 10 closed at its top by the cover 26 and closed at its bottom by the header 27. The header 27 and ring 28 are welded to the outer shell 10 around the inner periphery thereof in a well-known manner. The cover 26 is supported on ring 28 and is attached to the ring 28 by means of studs 29. The header 27 has an inlet opening 31 therein which communicates with the inside of the filter element and is connected to an inlet pipe 20. The shell has an outlet opening 21 therein which is connected to a suitably flanged pipe whereby it is connected in a flow line.

The header 27 has an opening in the center that is connected to the backwash outlet fitting 22. A bearing 32 is fitted into this opening and the bearing 32 receives the lower end of the shaft 35.

Cage

Figure 3:
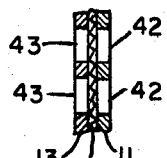
FIG. 3 is an enlarged partial view of the filter element.

The filter element is made up of the hollow cylindrical inner cage 13 and the hollow cylindrical outer cage 11 that sandwich the filter media 12 therebetween. The inner cage and outer cage have holes 43 and 42 respectively that align with each other as shown in FIG. 3, so that a segment of wire screen straining mesh or filter media 12 is exposed in each hole. This will be more completely described hereinafter.

The top of the filter cage is supported in the body by means of a ring 37 and the bottom is supported in a ring 38. The ring 38 is L-shaped in cross section and is welded to the header 27 so that it presents an annular seat 39. The seat 39 receives the ring 40 which is welded to the outer periphery of the inner cage 13. It will be noted that the inner cage 13 is longer than the outer cage 11 and the ends of inner cage 13 extend above and below it. The ring 40 has an O-ring seal therein which forms sealing engagement between the ring 40 and the ring 38.

The outer periphery of the upper end of the inner cage is welded to the ring 37 and the ring 37 has an O-ring 41 in a suitable groove which makes sealing engagement with the inner periphery of the ring 28.

It will be noted that the lower ring 40 is smaller than the upper ring 37 so that the strainer can be readily removed by removing the cover 27 and lifting the entire filter element out.

The holes 43, in which the particulate matter filtered from the fluid is collected, can be about three-sixteenth inch to about one-half inch, preferably about one-fourth inch in diameter. The inner shell 13 of the cage must be of sufficient thickness to provide mechanical integrity and volume for the collection of particulate matter. It is preferred that the ratio of open to closed area in inner cage 13 and outer cage 11 be as large as possible, commensurate with the assurance of structural strength in the drilled cages.

The filter element disclosed herein can be made by the following method to perform the required function. The inner cage is made by providing a hollow cylindrical member which has an outside diameter slightly greater than the desired diameter of the finished inner cage 13. The inner cage is then welded at its lower end to the ring 40 and at its upper end to ring 37 and all surfaces are rough machined to remove scale and weld spatter. The inner cage 13 is then heat treated to relieve all internal stresses. All surfaces of the inner cage 13 are then accurately machined to the proper finished dimension and shape.

A second hollow cylindrical member is then provided to form the outer cage 11 and this hollow cylindrical member is rough machined inside and out to remove scale. The vertical flanges 50, 51, 52, and 53 are then welded in place to the outer hollow cylindrical member and the assembly is stress relieved.

The inner periphery of the outer cage is machined to a finish dimension which is sufficient to give a clearance space between the inner and outer cage sufficient for the mesh filter media 12. That is, the inside diameter of the outer cage 11 will be an amount greater than the outside diameter of the inner cage 13 equal to twice the approximate thickness of the mesh 12. The outer cage 11 is then split axially between the flanges 50 and 51 and between the flanges 52 and 53 to provide two separate halves of the cage.

The outer periphery of the inner cage 13 is then wrapped with a shim material having a thickness approximately equal to the thickness of the strainer element 12, and the outer cage 11 is placed therearound and bolts 54 and 55 are put in place and tightened. Multiple holes 42 and 43 are then drilled and deburred. Two holes 57 and 58 are then reamed out and a locating dowel is put therethrough approximately halfway between the flanges 50, 51, 52, and 53.

The bolts 54 and 55 are then removed, the shim taken out, and the filter media 12 assembled between the outer and inner cages. The filter element 12 is assembled by laying the filter mesh over the outside circumference of the inside shell after removing the outer cage, and then putting the outer cage halves carefully over the mesh. Bolts 54 and 55 are then inserted. The cage assembly is then ready to assemble in the filter body as shown in FIGS. 1 and 2.

Straining Mesh

Experimental work has shown that with a screen having a mesh approximately 100×100 with 0.0065-inch openings, particles that would be deleterious to other equipment in the system will be filtered out. It has been found that by using a filter mesh much finer than the smallest particles to be removed, the problem of severe blinding and inefficient backwash can be alleviated. Thus, screens with openings of 75 microns or less are found to give unexpected results in efficiency of backwash in the filter disclosed herein.

Backwash Arm

Although only one backwash arm 15 is shown in FIGS. 1 and 2, the backwash tube 35 can be equipped with multiple backwash arms. For example, tube 35 can be provided with two backwash arms 15 mounted at 180° from each other. The tube 35 is attached to shaft 34 and is supported by a bearing in the speed reducer 17 and driven by the variable speed motor 19 through the speed reducer 17 and keyed thereto by means of a shear pin 18. The vertical and horizontal thrust of the shaft 34 is provided by speed reducer 17.

The lower end of the backwash tube 35 indicated communicates with the backwash outlet 22. Backwash tube 35 has a slot 36 in one side at an intermediate position. Slot 36 is connected to the backwash arm 15. The cover 26 has packing in a central opening therein with suitable packing gland 16 through which the shaft 34 of the backwash arm 15 extends. Header 27 has inserted therein a bearing 32 which supports and seals the lower end of backwash tube 35.

The backwash arm 15 has the shoes 25 attached to its outer end. The shoes 25 are spaced from each other and provide a space 44 therebetween. Thus, when the backwash arm 15 is swung around its axis, which is coaxial with the central axis of the strainer, the shoes 25 move in close relation to the inside periphery of the inner cage, forming a seal between space 44 and the interior of the straining mesh 12. It has also been discovered in one application that the rotation of the backwash arm can be controlled within a range of 2 to 30 surface feet per minute for optimum efficiency. The space 44 provides a lower pressure area on the inner periphery of the inner cage to receive particles of material which have been strained out of the liquid on the upstream side of the filter mesh. Since the liquid on the downstream side of the mesh will have a higher pressure than the pressure in the space 44 due to removal of fluid by metering device 60, liquid will flow through the filter element in a reverse direction; that is, from the outside of the mesh to the inside of space 44 and into the backwash arm 15, thereby carrying the material that has been trapped in the holes 43 and on the screen straining mesh or wire screen filter media into the backwash arm 15 and out fitting 22.

The shoes 25 operate as close as possible to the inner periphery of the inner cage 13. The clearance between the shoes and the inside of the cage should never exceed one-eighth inch.

The slot defined at 44 in the backwash arm 15 can be, for example, between one-quarter inch wide and 2 inches wide, but preferably the slot 44 is of a width to cover one vertical row of holes 43. The shoes 25 are preferably wide enough to prevent leakage of the fluid from the interior of the filter element into the backwash arm 15. In order to provide effective sealing, the shoes 25 and bearing 32 can be constructed of a resilient material, for example, polytetrafluoroethylene (Teflon), polyoxy methylene resin (Delrin), polyethylene, polypropylene, etc., and can be operated in contact with the inner periphery of the inner surface of the cage 13.

Filter and Control Combination

Figure 4:
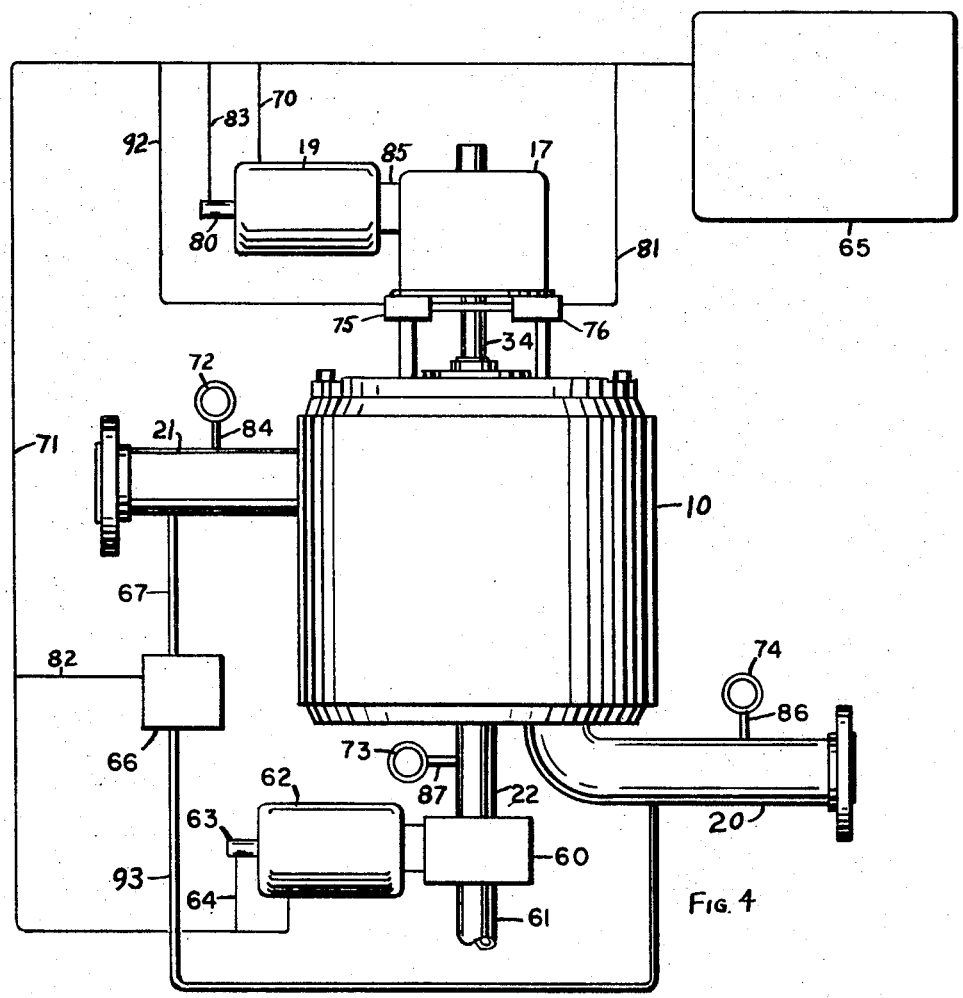
FIG. 4 is a block diagram of the filter and control elements.

The filter and controls in combination with it are shown in FIG. 4. The filter has an inlet 20 and outlet 21. The backwash metering device 60 shown is connected to the backwash outlet fitting 22. It may discharge to a drain through a line 61 or it may discharge to some other suitable repository. The backwash metering device 60, which can be in the form of a rotary positive displacement pump, is driven by a variable speed motor 62, having a tachometer 63 connected to it, which is connected by the line 64 and 71 to the control cabinet 65. A suitable differential transducer 66 is connected to the outlet 21 through the line 67, to the inlet 20 through the line 93. A variable speed drive motor 19, having a tachometer 80 connected to it, is connected through a line 70 to the control cabinet 65. The transducer 66 is connected through lines 71 and 82 to the control cabinet 65. Tachometer 80 is connected through line 83 to control cabinet 65.

Thus, transducer 66 senses differential pressure across the filter element and causes the speed of drive motor 19 to increase when the pressure difference increases or to decrease when the pressure difference decreases. An adjustable proportional control maintains the speed of the motor 62 at a predetermined relationship to the speed of motor 19.

Figure 5:
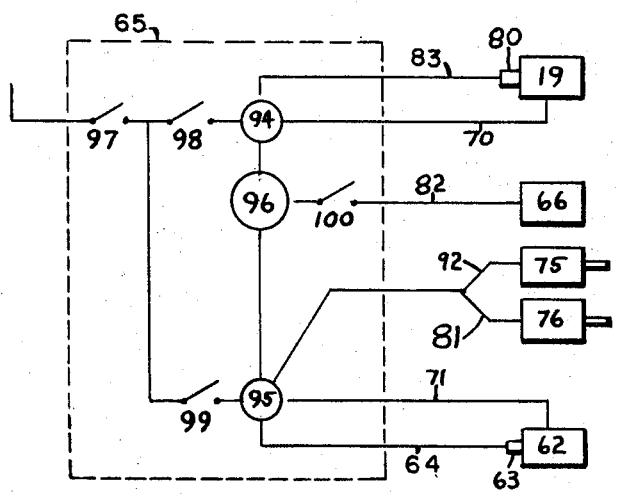
FIG. 5 is a schematic diagram of the electrical controls.

A method of electrical control is shown in FIG. 5 which schematically illustrates the relationship of the motors, tachometers, limit switches, differential pressure transducer, and control cabinet components. The control cabinet contains a conventional type of control similar to Boston Gear Works Series E control marketed under their trademark "RATIOTROL." Components located in the cabinet 65 consist of two individual motor speed controls 94 and 95 which regulate the speeds of motors 19 and 62 respectively. Tachometer 80 feeds a signal back to the speed control 94 to accurately maintain the selected speed under varying load conditions. Tachometer 63 functions similarly with speed control 95. Both tachometers 80 and 63 may be provided with a meter to visually indicate motor speed.

A master speed control 96 provides the means of simultaneously adjusting the speeds of motors 19 and 62 through their individual speed control. This adjustment can be made manually by means of a selector mounted on the cabinet or automatically by means of the pressure transducer.

Switch 97 controls the main electrical supply. Switches 98 and 99 provide the means of isolating individual speed controls for testing and calibrating purposes. Switch 100 provides a means for isolating the transducer 66 for testing and calibration purposes.

Suitable gauges 72, 73, and 74 are connected by lines 84, 87, and 86 to lines 21, 22, and 20, respectively, as shown to indicate the pressures in these lines. Limit switches 75 and 76 are connected through lines 92 and 81 to the control 65. When the backwash arm 15 with shoes 25 and backwash arm stop 44 pass over the unperforated areas 77 and 78 of the cage, the power to motor 62 will be shut off by limit switches 75 and 76 so that a suction pressure will not be exerted on this unperforated area of the strainer. Such a suction on the unperforated area of the filter element might cause the backwash arm to be held against the inner cage and resist further movement due to the suction created by metering device 60 acting as a pump under these conditions.

Backwash metering device 60 will deliver material at a controlled rate. The displacement and the speed of the device 60 can be so regulated by the controls in cabinet 65 that it will remove an amount of material from the openings 43 approximately equal to the volume of openings 43 each time the slot 44 moves over these openings. Thus, the transducer 66 can be used to actuate the controls in cabinet 65 when a predetermined variation in pressures is sensed therein. The controls may be so actuated that the speed of the backwash metering device 60, sensed and regulated by tachometer 63 and the speed of the backwash arm motor 19, sensed and regulated by tachometer 80, will vary as required to maintain flow through the filter while backwashing with the minimum amount of fluid required to remove the accumulated debris. The type of control described can be accomplished by electrical, hydraulic, or pneumatic means.

We claim:

1. In combination, a backwash filter and a control for said backwash, said filter having an inlet and an outlet, a body and a filter element in said body in the flow path of liquid between said inlet and said outlet, a backwash element, means to move said backwash element over said filter element, said control comprising sensing means on said filter for sensing the pressure differential caused by debris accumulated on said filter element, said control means being adapted to control said backwash element whereby said backwash element backwashes said filter element at a rate proportional to the amount of said debris being accumulated on said filter element.

2. The combination recited in claim 1 wherein said sensing means comprises means to sense a pressure differential between the upstream side of said filter element and the downstream side of said filter element.

3. The combination recited in claim 1 wherein said filter element has openings therethrough having cavities at the upstream side of said filter element.

4. The combination recited in claim 1 wherein said means to move said backwash element comprises a variable speed motor, and means on said control unit to control the speed of said motor.

5. In combination, a backwash filter and control means for said backwash, said filter having a body having an inlet, an outlet, and a filter element in said body, a hollow backwash arm, drive means to provide relative motion of said backwash arm and said filter element, positive displacement means connected to said control means removing liquid through said arm at a predetermined rate, sensing means for sensing the pressure differential caused by debris on said element, said control means being connected to said displacement means and to said drive means, an adjustable control means sensitive to differential pressure across said filter element for controlling the speed of said backwash arm and said backwash flow control means, said sensing means being adapted to actuate said arm to remove said debris from said filter element at a rate determined by the rate of deposit of debris on said filter element.

6. The combination recited in claim 5 wherein said control comprises transducer means for sensing and controlling the differential pressure between said outlet and said inlet, and tachometer means for sensing and controlling the speed of said drive means and the speed of said displacement means.

7. A filter and control therefor comprising a filter body having an inlet and an outlet with a filter element therebetween, said filter element having openings therethrough for liquid to flow from said inlet to said outlet, debris collecting cavities formed on the upstream side of said filter, backwash means, said backwash means supported on said filter body comprising a backwash member adapted for relative movement over said cavities on the upstream side thereof, and positive displacement means connected to said backwash means, said positive displacement means being adapted to remove the amount of material from said openings necessary to maintain predetermined flow conditions.

8. The filter recited in claim 7 wherein means is provided on said filter to move said backwash means over said filter at a controlled rate.

9. The filter recited in claim 8 wherein said control means comprises means sensitive to the pressure differential created by the debris accumulated in said enlarged portions.

10. The filter recited in claim 9 wherein said filter element has portions thereof which have no perforated portions, and means on said filter to deactuate said positive displacement means when said backwash means passes over said unperforated areas.

11. A filter and control comprising a filter body having an inlet and an outlet with a perforated filter element therebetween, a backwash arm supported on said filter body, variable speed motor means connected to said backwash arm to rotate said backwash arm to move a backwash arm over said filter element, backwash flow control means connected to said backwash arm, backwash motor means to drive said backwash flow control means, an adjustable control means sensitive to differential pressure across said filter element for controlling the speed of said backwash arm and said backwash flow control means.

12. The filter recited in claim 11 wherein means is provided on said control to shut off said backwash flow control means when said backwash element passes over dead spots in said filter element.

13. In combination, a backwash filter and a control comprising a filter element and scanning means, said scanning means having a low-pressure area and means to move said scanning means over the upstream surface of said filter element, and a metering device on the backwash outlet of said scanning means, said metering device being adapted to pass a controlled volume of fluid independently of the pressure on the metering device, and an adjustable control means sensitive to differential pressure across said filter element for controlling the speed of said backwash arm and said backwash flow control means.

14. The combination recited in claim 13 wherein the backwash metering device is a positive displacement pump.

15. The combination recited in claim 14 wherein means is provided to control the speed of the metering device at a fixed ratio to the speed of scanning.

16. The combination recited in claim 15 wherein means is provided to control the speed of the metering device at a fixed ratio to the speed of scanning and wherein the said ratio is adjustable.